United States Patent
Yang

(10) Patent No.: US 11,356,974 B2
(45) Date of Patent: Jun. 7, 2022

(54) METHOD AND DEVICE FOR IMPROVING RELIABTILITY OF PAGING

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/100,776

(22) Filed: Nov. 20, 2020

(65) Prior Publication Data

US 2021/0076354 A1  Mar. 11, 2021

Related U.S. Application Data

(63) Continuation of application No. PCT/CN2019/088276, filed on May 24, 2019.

(30) Foreign Application Priority Data

May 24, 2018 (CN) .......................... 201810510637.3

(51) Int. Cl.
*H04W 68/00* (2009.01)
*H04W 76/19* (2018.01)
(Continued)

(52) U.S. Cl.
CPC ......... *H04W 68/005* (2013.01); *H04W 60/04* (2013.01); *H04W 76/19* (2018.02); *H04W 76/27* (2018.02); *H04W 80/02* (2013.01)

(58) Field of Classification Search
None
See application file for complete search history.

(56) References Cited

U.S. PATENT DOCUMENTS

2013/0324157 A1   12/2013  Park
2014/0010204 A1*   1/2014  Xu .................. H04W 36/38
                                                370/331
(Continued)

FOREIGN PATENT DOCUMENTS

CN    107666692 A    2/2018
EP    3349509 A1    7/2018
(Continued)

OTHER PUBLICATIONS

International Search Report in the international application No. PCT/CN2019/088276, dated Jul. 22, 2019.
(Continued)

*Primary Examiner* — Gary Lafontant
(74) *Attorney, Agent, or Firm* — Ladas & Parry, LLP

(57) ABSTRACT

Disclosed are a method and a device for improving the reliability of paging. The method comprises operations as follows. A first base station receives a first RRC message sent by a terminal. The first RRC message is an RRC connection resume request message or an RRC connection establishment request message, the first RRC message carries a first indication message, and the first indication message indicates that RRC connection resume or RRC connection establishment is used for a location update. The first base station sends, on the basis of the first indication message, a second RRC message to the terminal, the second RRC message indicates that the terminal is allowed to access to the first base station.

10 Claims, 4 Drawing Sheets

(51) Int. Cl.
   *H04W 76/27* (2018.01)
   *H04W 60/04* (2009.01)
   *H04W 80/02* (2009.01)

(56) References Cited

U.S. PATENT DOCUMENTS

2017/0245318 A1\* 8/2017 Rayavarapu ........ H04W 68/005
2018/0220341 A1   8/2018 Dai et al.
2021/0067945 A1\* 3/2021 Liu ...................... H04W 48/20

FOREIGN PATENT DOCUMENTS

WO   2017054168 A1   4/2017
WO   2018057120 A1   3/2018

OTHER PUBLICATIONS

Ericsson. "Connection Control TP" 3GPP TSG-RAN WG2#102, R2-1807910, May 10, 2018 (May 10, 2018), entire document.
Written Opinion of the International Searching Authority in the international application No. PCTCN2019/088276, dated Jul. 22, 2019 with English translation provided by Google Translate.
3GPP TSG-RAN WG2 #102 Tdoc R2-1807922, Busan, Korea, May 21-25, 2018, Agenda Item: 10.4.1.3.6 Connection resume procedure), Source: Ericsson, Title: Resuming after Reject with wait timer, Document for Discussion.
Supplementary European Search Report in the European application No. 19806497.4, dated Jun. 11, 2021.
Written Opinion of the International Search Authority in the international application No. PCT/CN2019/088276, dated Jul. 22, 2019.
First Office Action of the European application No. 19806497.4 dated Jan. 31, 2022.

\* cited by examiner

METHOD AND DEVICE FOR IMPROVING RELIABTILITY OF PAGING

CROSS-REFERENCE TO RELATED APPLICATIONS

This is a continuation application of International Patent Application No. PCT/CN2019/088276, filed on May 24, 2019, which claims priority to Chinese Application No. 201810510637.3 filed on May 24, 2018, the disclosures of which are hereby incorporated by reference in their entireties.

BACKGROUND

In order to meet people's pursuit of speed, delay, high-speed mobility and energy efficiency of services, as well as the diversity and complexity of services in future life, the 3rd Generation Partnership Project (3GPP) International Standards Organization begins to develop the 5th Generation (5G) mobile communication technology.

The main application scenarios of the 5G mobile communication technology includes: an Enhance Mobile Broadband (eMBB), Ultra Reliable Low Latency Communication (URLLC), and massive Machine Type Communication (mMTC).

In the 5G network environment, a new Radio Resource Control (RRC) state, namely an RRC inactive (RRC_INACTIVE) state, is defined for the purpose of reducing air interface signaling, and quickly resuming wireless connection and data service. the RRC_INACTIVE state is different from an RRC_IDLE state and an RC_CONNECTED state.

When a User Equipment (UE) is in the RRC_INACTIVE state, a network side configures the UE with a Radio Access Network (RAN) notification area through dedicated signaling. The RAN notification area may be one or more cells. When the UE moves in the area, the network side is not notified, and a mobile behavior under an idle state, that is, a cell selection and reselection principle, is followed. When the UE moves out of the configured RAN notification area, the UE is triggered to resume an RRC connection and reacquire the configured RAN notification area. When downlink data arrives at the UE, a base station (e.g. gNB) that maintains a connection between the RAN and a Core Network (CN) for the UE triggers all cells in the RAN notification area to send paging messages to the UE, so that the UE in an INACTIVCE state can resume the RRC connection for data reception.

Therefore, the UE goes from the INACTIVE state to the RRC_CONNECTED state in three conditions.

In a first condition, there is downlink data arriving at the UE, and the network side initiates paging for the RAN side, the UE is prompted to enter a connected state.

In a second condition, the UE initiates update for an RAN location area, such as a periodic update for a RAN location or a cross-area location update.

In a third condition, the UE has an uplink data transmission requirement, and the UE is prompted to enter the connected state.

Certainly, the network side may also reply to an RRC rejection message in response to an RRC connection resume request message sent by the UE in some conditions, such as load congestion. The RRC rejection message carries a time message, that is, waittimer, and the UE starts a timer upon receiving the waittimer. The UE does not attempt to send an RRC connection resume request message in the cell until the timer times out.

Referring to FIG. 1, when the UE is at a boundary (an area boundary of a Tracking Area (TA) or an area boundary of an RAN-based notification area (RNA)) of a certain location update area, if the UE moves out of the location update area and finds that a location area where the UE is located currently is no longer a location area configured by the network side, the UE attempts to send a location area update request message, which requires to first send an RRC connection resume request message. Upon receiving an RRC rejection message from the network side, and the RRC rejection message carrying waittimer, the UE is allowed to send an RRC connection resume request message until the timer times out. If there is paging from the network side before the timer times out, the UE does not receive the paging because the UE has moved out of the location update area.

SUMMARY

The disclosure relates to the technical field of wireless communication, and more particularly to a method and device for improving reliability of paging, and a computer storage medium, for solving the technical problems.

A first aspect of the embodiments provides a method for improving reliability of paging, which may include the following operations.

A first base station receives a first RRC message sent by a terminal. The first RRC message is an RRC connection resume request message or an RRC connection establishment request message. The first RRC message carries first indication information, and the first indication information is used to indicate that RRC connection resume or RRC connection establishment is used for location update.

The first base station sends a second RRC message to the terminal based on the first indication information. The second RRC message is used to indicate that the terminal is allowed to access to the first base station.

A second aspect of the embodiments provides a method for improving reliability of paging, which may include the following operations.

The first base station receives a first RRC message sent by a terminal. The first RRC message is an RRC connection resume request message or an RRC connection establishment request message. The first RRC message carries first indication information, and the first indication information is used to indicate that RRC connection resume or RRC connection establishment is used for location update.

The first base station sends a third RRC message to the terminal based on the first indication information. The third RRC message is used to indicate that the terminal is denied access to the first base station. The first base station sends to a second base station identification information of a target cell in which the terminal is located when the terminal sends the first RRC message, so that the second base station sends a paging message in an RNA including the target cell when paging of the terminal is triggered.

A third aspect of the embodiments provides a method for improving reliability of paging, which may include the following operations.

The first base station receives a first RRC message sent by the terminal. The first RRC message is an RRC connection resume request message or an RRC connection establishment request message. The first RRC message carries first indication information, and the first indication information is used to indicate that RRC connection resume or RRC connection establishment is used for location update.

The first base station sends a third RRC message to the terminal based on the first indication information. The third RRC message is used to indicate that the terminal is denied access to the first base station. The third RRC message carries third indication information, and the third indication information is used to indicate the terminal to release UE context. The first base station sends fourth indication information to the second base station. The fourth indication information is used to indicate the second base station to release the UE context.

BRIEF DESCRIPTION OF THE DRAWINGS

The accompanying drawings described here are used for providing further understanding of the disclosure, and constitute a part of the disclosure. Schematic embodiments of the disclosure and description thereof are used for illustrating the disclosure rather than forming an improper limit to the disclosure. In the accompanying drawings.

DETAILED DESCRIPTION

In order to understand characteristics and technical contents in the embodiments of the present disclosure in more detail, the implementation of the embodiments of the disclosure is described in detail below in combination with the accompanying drawings. The accompanying drawings are only used for reference, rather than limiting the embodiments of the disclosure.

The technical solutions of the embodiments of the disclosure are mainly applied to a 5G mobile communication system. In practical, the technical solutions of the embodiments of the disclosure are not limited to the 5G mobile communication system, and may also be applied to other types of mobile communication systems. The main application scenarios in the 5G mobile communication system are described below.

1) In an eMBB scenario, eMBB is used by the user to acquire multimedia contents, services and data, and service needs thereof grow rapidly. Because the eMBB may be deployed in different scenarios, such as indoor, urban, country or the like, service capabilities and requirements thereof vary greatly. Therefore, the services is analyzed in combination with specific deployment scenarios.

2) In an URLLC scenario, typical applications of the URLLC include industrial automation, electrical automation, telemedicine operations, traffic safety assurance, or the like.

3) In an mMTC scenario, typical features of URLLC include high connection density, small data volume, delay insensitive services, low cost and long service life of modules or the like.

Three RRC states in a 5G network environment are described below.

1) In an RRC_IDLE state, mobility is UE-based cell selection and reselection, paging is initiated by a CN, and a paging area is configured by the CN. There is no UE AS context at the base station side. There is no RRC connection.

2) In an RRC_CONNECTED state, there is an RRC connection, and there is UE AS context at a base station and a UE. The network side knows that a location of the UE is a specific cell level. The mobility is controlled by the network side. Unicast data may be transmitted between the UE and the base station.

3) In an RRC_INACTIVE state, mobility is UE-based cell selection and re-selection, there is a connection between a CN and an RAN, the UE AS context exists on a certain base station, paging is triggered by the RAN, an RAN-based notification area is managed by the RAN, and the network side knows that a location of a UE is in a level of an RAN-based notification area.

Figure 1:
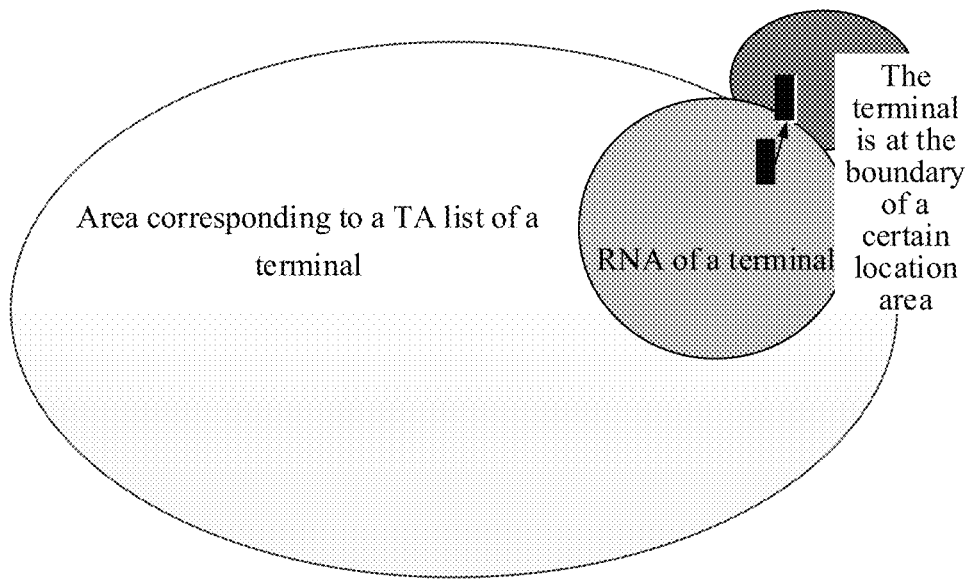
FIG. 1 is a schematic diagram of location update of a terminal.
Figure 2:
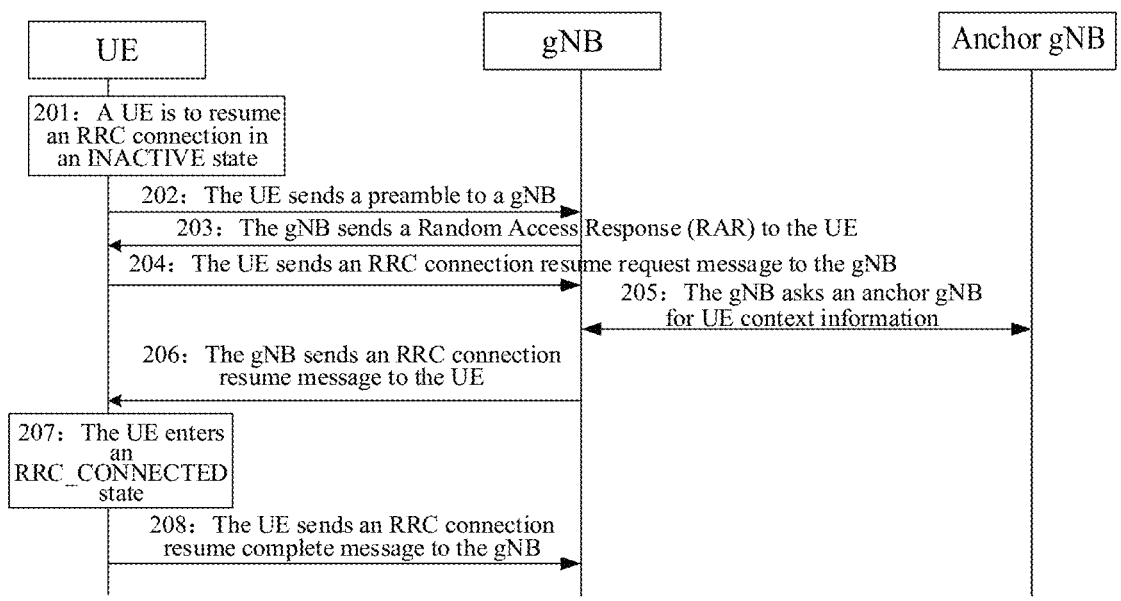
FIG. 2 is a schematic diagram of an RRC connection resume process.

FIG. 2 is a schematic diagram of an RRC connection resume process. As shown in FIG. 2, the RRC connection resume process includes the following operations.

At S201, a UE is to resume an RRC connection in an INACTIVE state.

At S202, the UE sends a preamble to a gNB.

At S203, the gNB sends a Random Access Response (RAR) to the UE.

At S204, the UE sends an RRC connection resume request message to the gNB.

At S205, the gNB asks an anchor gNB for UE context information.

At S206, the gNB sends an RRC connection resume message to the UE.

At S207, the UE enters an RRC_CONNECTED state.

At S208, the UE sends an RRC connection resume complete message to the gNB.

Here, the RRC connection establishment process may be understood by referring to the description of the RRC connection resume process, which will not be repeated here.

Figure 3:
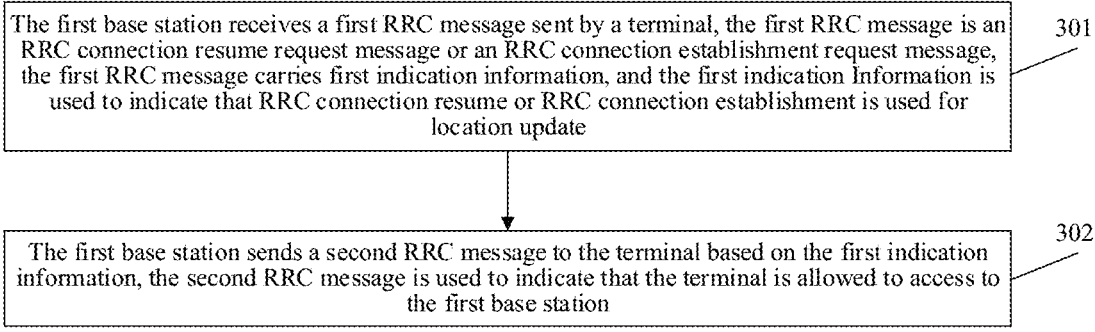
FIG. 3 is a first flowchart of a method for improving reliability of paging according to an embodiment of the disclosure.

FIG. 3 is a first flowchart of a method for improving reliability of paging according to an embodiment of the disclosure. As shown in FIG. 3, the method for improving reliability of paging may include the following operations.

At S301, a first base station receives a first RRC message sent by a terminal. The first RRC message is an RRC connection resume request message or an RRC connection establishment request message, the first RRC message carries first indication information, and the first indication information is used to indicate that RRC connection resume or RRC connection establishment is used for location update.

Here, the first base station is a target base station of a service terminal, and correspondingly the second base station is a source base station of the service terminal.

When the terminal performs location update, the terminal sends the first RRC message to the first base station. The first RRC message is an RRC connection resume request message or an RRC connection establishment request message. The first RRC message carries the first indication information, and the first indication information is used to indicate that RRC connection resume or RRC connection establishment is used for the location update.

In the embodiments of the disclosure, the first indication information being used to indicate that RRC connection resume or RRC connection establishment is used for the location update has the following two cases.

1) The first indication information is used to indicate that RRC connection resume or RRC connection establishment is used for RNA location update.

2) The first indication information is used to indicate that RRC connection resume or RRC connection establishment is used for TA location update.

At S302, the first base station sends a second RRC message to the terminal based on the first indication information. The second RRC message is used to indicate that the terminal is allowed to access to the first base station.

In the embodiments of the disclosure, after receiving the RRC connection resume request message or the RRC connection establishment request message carrying the first indication information sent by the terminal, the first base station may determine, based on the first indication information, that RRC connection resume or RRC connection establishment is used for location update, and sends the second RRC message to the terminal even if the network is in a congestion state. The second RRC message is used to indicate that the terminal is allowed to access to the first base station.

Figure 4:
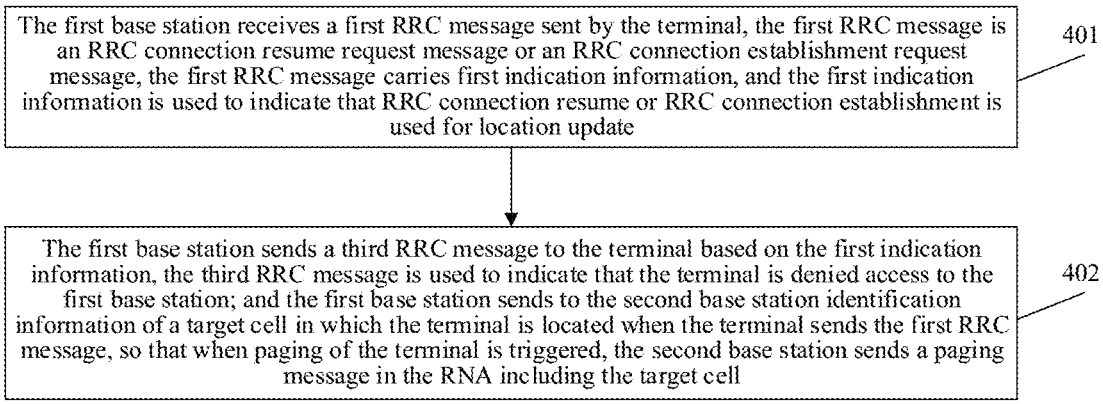
FIG. 4 is a second flowchart of a method for improving reliability of paging according to an embodiment of the disclosure.

FIG. 4 is a second flowchart of a method for improving reliability of paging according to an embodiment of the disclosure. As shown in FIG. 4, the method for improving reliability of paging may include the following operations.

At S401, the first base station receives a first RRC message sent by the terminal. The first RRC message is an RRC connection resume request message or an RRC connection establishment request message. The first RRC message carries first indication information, and the first indication information is used to indicate that RRC connection resume or RRC connection establishment is used for location update.

Here, the first base station is a target base station of the service terminal, and correspondingly the second base station is a source base station of the service terminal.

When the terminal performs location update, the terminal sends the first RRC message to the first base station. The first RRC message is an RRC connection resume request message or an RRC connection establishment request message. The first RRC message carries the first indication information, and the first indication information is used to indicate that RRC connection resume or RRC connection establishment is used for location update.

In the embodiments of the disclosure, the first indication information being used to indicate that RRC connection resume or RRC connection establishment is used for the location update has the following two cases.

1) The first indication information is used to indicate that RRC connection resume or RRC connection establishment is used for RNA location update.

2) The first indication information is used to indicate that RRC connection resume or RRC connection establishment is used for TA location update.

At S402, the first base station sends a third RRC message to the terminal based on the first indication information. The third RRC message is used to indicate that the terminal is denied access to the first base station. The first base station sends, to the second base station, identification information of a target cell in which the terminal is located when the terminal sends the first RRC message, so that when paging of the terminal is triggered, the second base station sends a paging message in an RNA including the target cell.

In the embodiments of the disclosure, the third RRC message, for example, is an RRC rejection message. If the network side denies the terminal access to the first base station, the network side sends to the second base station the identification information of the target cell in which the terminal is located when the terminal sends the first RRC message, so that when paging of the terminal is triggered, the second base station sends a paging message in the RNA including the target cell.

Specifically, 1) if the first indication information is used to indicate that the RRC connection resume or RRC connection establishment is used for the RNA location update, and the first RRC message carries UE identification information of the terminal, the first base station addresses the second base station according to the UE identification information of the terminal, and sends to the second base station the UE identification information of the terminal, MAC-I information and identification information of a target cell in which the terminal is located when the terminal sends the first RRC message, and the second base station verifies validity of the terminal according to the UE identification information of the terminal and the MAC-I information, and records identification information of the target cell in the RNA of the terminal. When the paging of the terminal is triggered, the second base station sends a paging message in the RNA including the target cell.

Here, the identification information of the target cell includes at least one of A PCI, an ARFCN, a CGI and a TAC.

Here, the UE identification information of the terminal may be an inactive radio network temporary identifier (I-RNTI).

2) If the first indication information is used to indicate that RRC connection resume or RRC connection establishment is used for the TA location update, and the first RRC message carries UE identification information of the terminal, the first base station addresses the second base station according to the UE identification information of the terminal, and sends to the second base station the UE identification information of the terminal, MAC-I information and identification information of the target cell in which the terminal is located when the terminal sends the first RRC message, and the second base station verifies validity of the terminal according to the UE identification information of the terminal and the MAC-I information, and records the identification information of the target cell in the RNA of the terminal. When the paging of the terminal is triggered, the second base station sends a paging message in the RNA including the target cell, while the second base station sends TA information of a target TA in which the terminal is located to a first core network element, and when initiating paging, the first core network element sends a paging message in a TA list including the TA information of the target TA.

Further, when sending the TA information of the target TA in which the terminal is located to the first core network element, the second base station also sends second indication information to the first core network element. The second indication information is used to indicate to the first core network element that the terminal moves from a source TA to the target TA, but is temporarily unable to access to the first base station, and the first core network element records the TA information of the target TA in the TA list of the terminal based on the second indication information.

Here, the identification information of the target cell includes at least one of a PCI, an ARFCN, a CGI and a TAC.

Here, the UE identification information of the terminal may be the I-RNTI.

Here, the first core network element is a Core Access and Mobility Management Function (AMF) of a 5G core network.

In the above solutions, the second base station and the first base station are different base stations, or the second base station and the first base station are the same base station. The second base station is a base station that saves UE context information.

Figure 5:
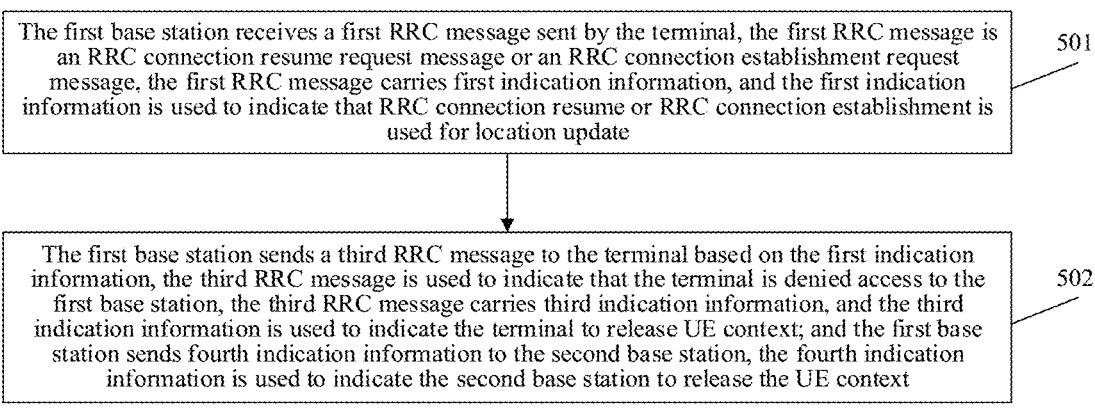
FIG. 5 is a third flowchart of a method for improving reliability of paging according to an embodiment of the disclosure.

FIG. 5 is a third flowchart of a method for improving reliability of paging according to an embodiment of the disclosure. As shown in FIG. 5, the method for improving reliability of paging may include the following operations.

At S501, a first base station receives a first RRC message sent by a terminal. The first RRC message is an RRC connection resume request message or an RRC connection establishment request message. The first RRC message carries first indication information, and the first indication information is used for indicating that RRC connection resume or RRC connection establishment is used for location update.

Here, the first base station is a target base station of the service terminal, and correspondingly the second base station is a source base station of the service terminal.

When the terminal performs location update, the terminal sends the first RRC message to the first base station. The first RRC message is an RRC connection resume request message or an RRC connection establishment request message. The first RRC message carries the first indication information, and the first indication information is used to indicate that RRC connection resume or RRC connection establishment is used for the location update.

In the embodiments of the disclosure, the first indication information being used to indicate that RRC connection resume or RRC connection establishment is used for the location update has the following two cases.

1) The first indication information is used to indicate that RRC connection resume or RRC connection establishment is used for RNA location update.

2) The first indication information is used to indicate that RRC connection resume or RRC connection establishment is used for TA location update.

At S502, the first base station sends a third RRC message to the terminal b the first indication information. The third RRC message is used for indicating that the terminal is denied access to the first base station, the third RRC message carries third indication information, and the third indication information is used to indicate the terminal to release UE context. The first base station sends fourth indication information to the second base station, and the fourth indication information is used to indicate the second base station to release the UE context.

Here, the third RRC message, for example, is an RRC rejection message.

In the above solutions, the second base station and the first base station are different base stations, or the second base station and the first base station are the same base station, and the second base station is a base station that saves UE context information.

Figure 6:
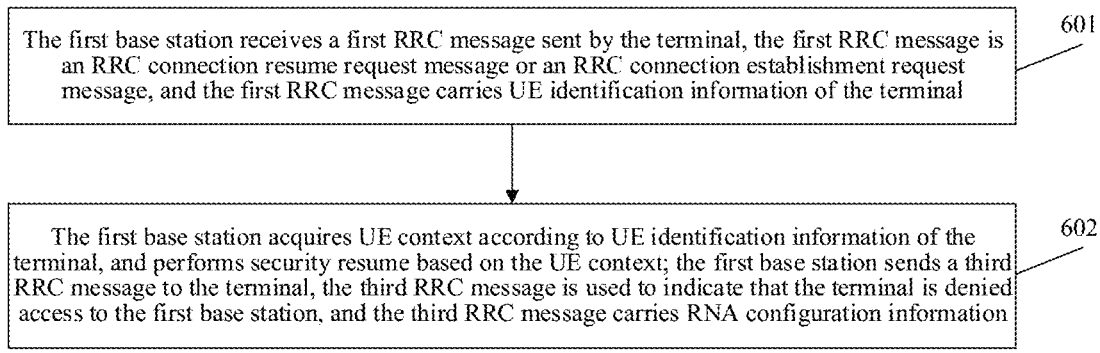
FIG. 6 is a fourth flowchart of a method for improving reliability of paging according to an embodiment of the disclosure.

FIG. 6 is a fourth flowchart of a method for improving reliability of paging according to an embodiment of the disclosure. As shown in FIG. 6, the method for improving reliability of paging may include the following operations.

At S601, a first base station receives a first RRC message sent by a terminal. The first RRC message is an RRC connection resume request message or an RRC connection establishment request message, and the first RRC message carries UE identification information of the terminal.

Here, the first base station is a target base station of a service terminal, and correspondingly the second base station is a source base station of the service terminal.

When the terminal performs location update, the terminal sends the first RRC message to the first base station. The first RRC message is an RRC connection resume request message or an RRC connection establishment request message.

Optionally, the first RRC message carries first indication information, and the first indication information is used to indicate that RRC connection resume or RRC connection establishment is used for the location update.

In the embodiments of the disclosure, the first indication information being used to indicate that RRC connection resume or RRC connection establishment is used for the location update has the following two cases.

1) The first indication information is used to indicate that RRC connection resume or RRC connection establishment is used for RNA location update.

2) The first indication information is used to indicate that RRC connection resume or RRC connection establishment is used for TA location update.

At S602, the first base station acquires UE context according to the UE identification information of the terminal, and performs security resume based on the UE context. The first base station sends a third RRC message to the terminal. The third RRC message is used for indicating that the terminal is denied access to the first base station, and the third RRC message carrying RNA configuration information.

Specifically, after receiving the RRC connection resume request message or the RRC connection establishment request message, if the network side denies the access of the terminal, the network side acquires UE context according to the UE identification information carried in a MSG3, and resumes security. Then, the network side replies to an RRC rejection message in an SRB1 message. The RRC rejection message carries RNA related configuration information.

Here, the third RRC message is for example the RRC rejection message.

Here, the RNA configuration information is for example an RNTI-RNTI, a DRX or the like.

In the technical solutions of the embodiments of the disclosure, in one aspect, 1) the first base station receives a first RRC message sent by the terminal. The first RRC message is an RRC connection resume request message or an RRC connection establishment request message. The first RRC message carries the first indication information, and the first indication information is used to indicate that RRC connection resume or RRC connection establishment is used for location update. 2) the first base station sends a second RRC message to the terminal based on the first indication information. The second RRC message is used to indicate that the terminal is allowed to access to the first base station. Alternatively, the first base station sends a third RRC message to the terminal based on the first indication information. The third RRC message is used to indicate that the terminal is denied access to the first base station. The first base station sends to the second base station identification information of the target cell in which the terminal is located when the terminal sends the first RRC message, so that the second base station sends a paging message in an RNA including a target cell when paging of the terminal is triggered. Alternatively, the first base station sends a third RRC message to the terminal based on the first indication information. The third RRC message is used to indicate that the terminal is denied access to the first base station. The third RRC message carries third indication information, and the third indication information is used to indicate the terminal to release UE context. The first base station sends fourth indication information to the second base station, and the fourth indication information is used to indicate the second base station to release the UE context. In another aspect, 1) the first base station receives a first RRC message sent by the terminal. The first RRC message is an RRC connection resume request message or an RRC connection establishment request message, and the first RRC message carries UE identification information of the terminal. 2) the first base station acquires UE context according to the UE identification information of the terminal, and performs security resume based on the UE context. 3) the first base station sends a third RRC message to the terminal. The third RRC message is used to indicate that the terminal is denied access to the first base station, and the third RRC message carries RNA configuration information. With the technical solutions of the embodiments of the disclosure, for the RRC connection resume request message or the RRC connection establishment request message in location update type, if the network side denies the request message, it is ensured by the network side that the paging message of the terminal in this period is reachable, which prevents the terminal from missing the paging message and improving the reliability of receiving the paging message.

Figure 7:
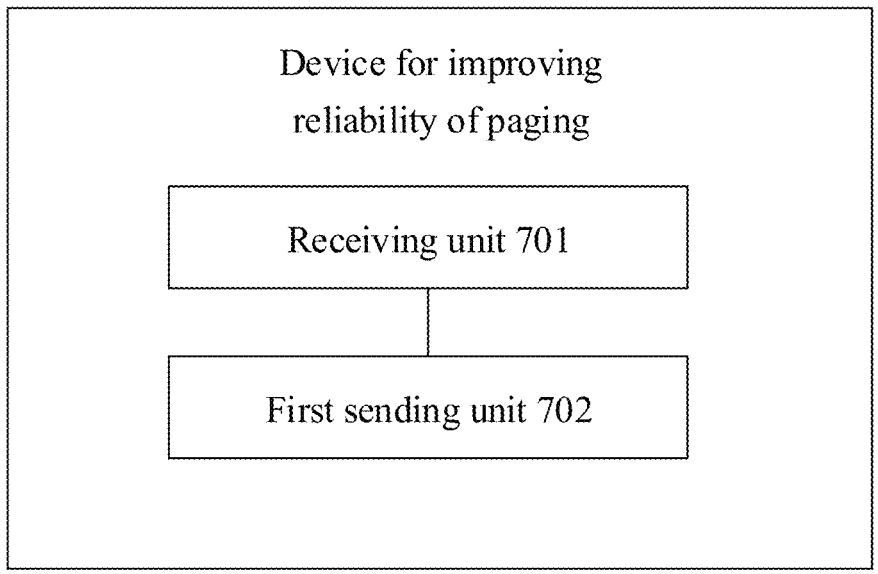
FIG. 7 is a first schematic structural diagram of a device for improving reliability of paging according to an embodiment of the disclosure.

FIG. 7 is a first schematic structural diagram of a device for improving reliability of paging according to an embodiment of the disclosure. As shown in FIG. 7, the device may include a receiving unit 701 and a first sending unit 702.

The receiving unit 701 is configured to receive a first RRC message sent by a terminal. The first RRC message is an RRC connection resume request message or an RRC connection establishment request message, the first RRC message carries first indication information, and the first indication information is used to indicate that RRC connection resume or RRC connection establishment is used for location update.

The first sending unit 702 is configured to send a second RRC message to the terminal based on the first indication information. The second RRC message is used to indicate that the terminal is allowed to access to the first base station.

In an embodiment, the first indication information being used to indicate that RRC connection resume or RRC connection establishment is used for the location update has the following two cases.

The first indication information is used to indicate that RRC connection resume or RRC connection establishment is used for RNA location update.

Alternatively, the first indication information is used to indicate that RRC connection resume or RRC connection establishment is used for TA location update.

Those skilled in the art should understand that the function implemented by each unit in the device for improving reliability of paging shown in FIG. 7 may be understood with reference to the related description of the above method for improving reliability of paging. The functions of each unit in the device for improving reliability of paging shown in FIG. 7 may be realized through a program running in a processor, and may also be realized through a specific logical circuit.

Figure 8:
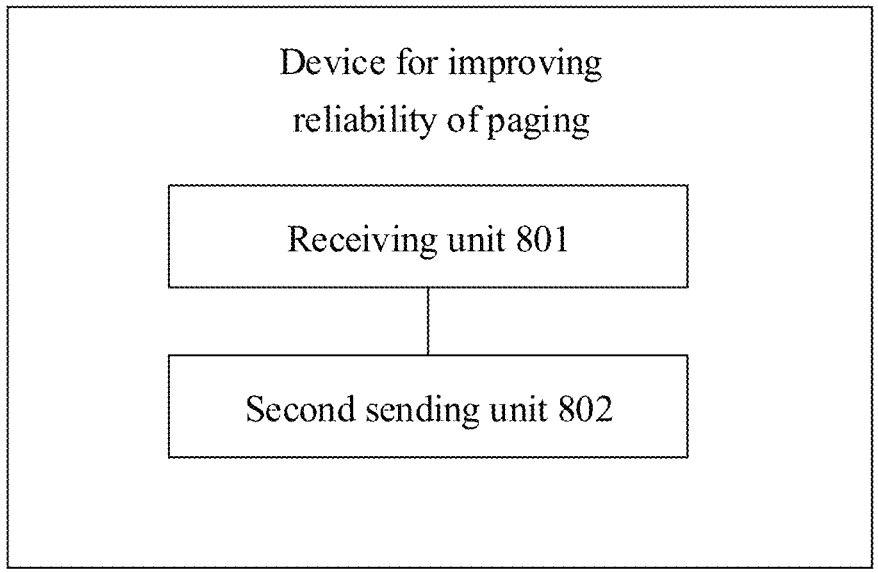
FIG. 8 is a second schematic structural diagram of a device for improving reliability of paging according to an embodiment of the disclosure.

FIG. 8 is a second schematic structural diagram of a device for improving reliability of paging according to an embodiment of the disclosure. As shown in FIG. 8, the device may include a receiving unit 801 and a second sending unit 802.

The receiving unit 801 is configured to receive a first RRC message sent by a terminal. The first RRC message is an RRC connection resume request message or an RRC connection establishment request message, the first RRC message carries first indication information, and the first indication information is used to indicate that RRC connection resume or RRC connection establishment is used for location update.

The second sending unit 802 is configured to send a third RRC message to the terminal based on the first indication information. The third RRC message is used to indicate that the terminal is denied access to the first base station. The first base station sends, to the second base station, identification information of a target cell in which the terminal is located when the terminal sends the first RRC message, so that when paging of the terminal is triggered, the second base station sends a paging message in an RNA area including the target cell.

In an embodiment, if the first indication information is used to indicate that the RRC connection resume or RRC connection establishment is used for the RNA location update, and the first RRC message carries UE identification information of the terminal, the second sending unit 802 is configured to address the second base station according to the UE identification information of the terminal, and sends to the second base station the UE identification information of the terminal, MAC-I information and identification information of a target cell in which the terminal is located when the terminal sends the first RRC message. The second base station verifies validity of the terminal according to the UE identification information of the terminal and the MAC-I information, and records identification information of the target cell in the RNA of the terminal. When the paging of the terminal is triggered, the second base station sends a paging message in the RNA including the target cell.

In an embodiment, if the first indication information is used to indicate that RRC connection resume or RRC connection establishment is used for the TA location update, and the first RRC message carries UE identification information of the terminal, the second sending unit 802 is configured to address the second base station according to the UE identification information of the terminal, and sends to the second base station the UE identification information of the terminal, MAC-I information and identification information of the target cell in which the terminal is located when the terminal sends the first RRC message. The second base station verifies validity of the terminal according to the UE identification information of the terminal and the MAC-I information, and records the identification information of the target cell in the RNA of the terminal. When the paging of the terminal is triggered, the second base station sends a paging message in the RNA including the target cell, while the second base station sends TA information of a target TA in which the terminal is located to a first core network element. When initiating paging, the first core network element sends a paging message in a TA list including the TA information of the target TA.

In an implementation mode, the second sending unit 802 is further configured to send second indication information to the first core network element when sending the TA information of the target TA in which the terminal is located to the first core network element. The second indication information is used to indicate to the first core network element that the terminal moves from a source TA to the target TA, but is temporarily unable to access to the first base station. The first core network element records the TA information of the target TA in the TA list of the terminal based on the second indication information.

In an embodiment, the identification information of the target cell includes at least one of a PCI, an ARFCN, a CGI and a TAC.

In an embodiment, the second base station and the first base station are different base stations, or the second base station and the first base station are the same base station, and the second base station is a base station that saves UE context information.

Those skilled in the art should understand that the function implemented by each unit in the device for improving reliability of paging as shown in FIG. 8 may be understood with reference to the related description of the method for improving reliability of paging. The functions of each unit in the device for improving reliability of paging shown in FIG. 8 may be realized through a program running in a processor, and may also be realized through a specific logical circuit.

Figure 9:
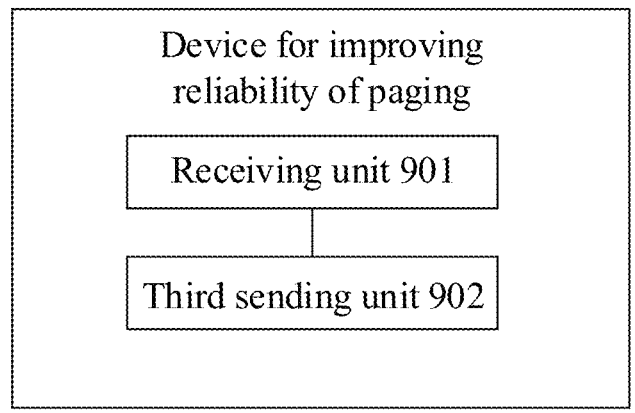
FIG. 9 is a third schematic structural diagram of a device for improving reliability of paging according to an embodiment of the disclosure.

FIG. 9 is a third schematic structural diagram of a device for improving reliability of paging according to an embodiment of the disclosure. As shown in FIG. 9, the device may include a receiving unit 901 and a third sending unit 902.

The receiving unit 901 is configured to receive a first RRC message sent by a terminal. The first RRC message is an RRC connection resume request message or an RRC connection establishment request message. The first RRC message carries first indication information, and the first indication information is used for indicating that RRC connection resume or RRC connection establishment is used for location update.

The third sending unit 902 is configured to send a third RRC message to the terminal based on the first indication information. The third RRC message is used for indicating that the terminal is denied access to the first base station, the third RRC message carries third indication information, and the third indication information is used to indicate the terminal to release UE context. The third sending unit 902 is configured to send fourth indication information to the second base station. The fourth indication information is used to indicate the second base station to release the UE context.

In an embodiment, the first indication information being used to indicate that RRC connection resume or RRC connection establishment is used for the location update has the following two cases.

The first indication information is used to indicate that RRC connection resume or RRC connection establishment is used for RNA location update.

Alternatively, the first indication information is used to indicate that RRC connection resume or RRC connection establishment is used for TA location update.

In an embodiment, the second base station and the first base station are different base stations, or the second base station and the first base station are the same base station, and the second base station is a base station that saves UE context information.

Those skilled in the art should understand that the function implemented by each unit in the device for improving reliability of paging as shown in FIG. 9 may be understood with reference to the related description of the method for improving reliability of paging. The functions of each unit in the device for improving reliability of paging shown in FIG. 9 may be realized through a program running in a processor, and may also be realized through a specific logical circuit.

Figure 10:
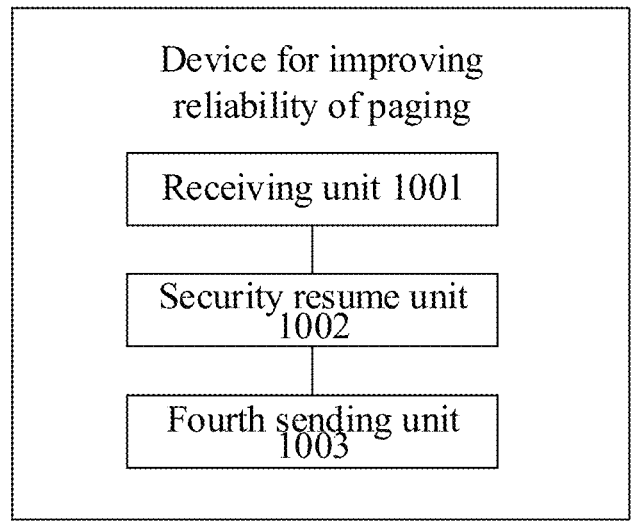
FIG. 10 is a fourth schematic structural diagram of a device for improving reliability of paging according to an embodiment of the disclosure.

FIG. 10 is a fourth schematic structural diagram of a device for improving reliability of paging according to an embodiment of the disclosure. As shown in FIG. 10, the device may include a receiving unit 1001, a security resume unit 1002 and a fourth sending unit 1003.

The receiving unit 1001 is configured to receive a first RRC message sent by a terminal. The first RRC message is an RRC connection resume request message or an RRC connection establishment request message, and the first RRC message carries UE identification information of the terminal The security resume unit 1002 is configured to acquire UE context according to the UE identification information of the terminal, and perform security resume based on the UE context.

The fourth sending unit 1003 is configured to send a third RRC message to the terminal. The third RRC message is used for indicating that the terminal is denied access to the first base station, and the third RRC message carrying RNA configuration information In an embodiment, the first RRC message carries first indication information, and the first indication information is used to indicate that RRC connection resume or RRC connection establishment is used for the location update.

In an embodiment, the first indication information being used to indicate that RRC connection resume or RRC connection establishment is used for the location update has the following two cases.

The first indication information is used to indicate that RRC connection resume or RRC connection establishment is used for RNA location update.

Alternatively, the first indication information is used to indicate that RRC connection resume or RRC connection establishment is used for TA location update.

Those skilled in the art should understand that the function implemented each unit in the device for improving reliability of paging as shown in FIG. 10 may be understood with reference to the related description of the method for improving reliability of paging. The functions of each unit in the device for improving reliability of paging shown in FIG. 10 may be realized through a program running in a processor, and may also be realized through a specific logical circuit.

When being implemented in form of software functional module and sold or used as an independent product, the above device for improving reliability of paging of the embodiments of the disclosure may also be stored in a computer-readable storage medium. Based on such an understanding, an essential part of the technical solutions of the embodiments of the disclosure or a part of the technical solutions making contributions to the conventional art may be embodied in form of software product, and the computer software product is stored in a storage medium, including a plurality of instructions configured to enable a computer device (which may be a personal computer, a server, a network device or the like) to execute all or a part of the method described in each embodiment of the disclosure. The above storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure further provide a computer-readable storage medium having stored thereon a computer-executable instruction. The computer-executable instruction, when being executed by a processor, performs the above method for improving reliability of paging according to the embodiments of the disclosure.

Figure 11:
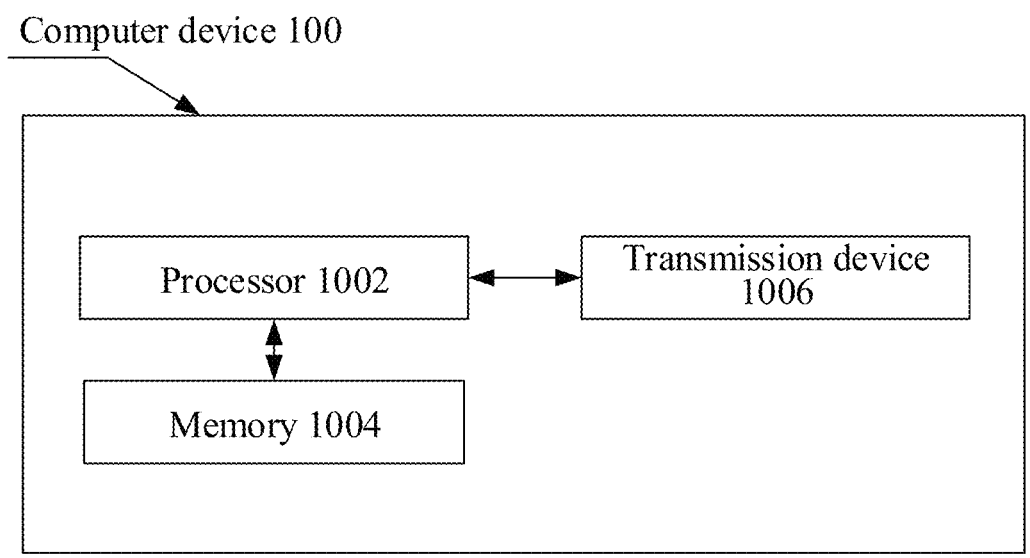
FIG. 11 is a schematic structural diagram of a computer device according to an embodiment of the disclosure.

FIG. 11 is a schematic structural diagram of a computer device according to an embodiment of the disclosure. The computer device may be an access network device (e.g. a base station), or other types of devices, such as a terminal and a core network element. As shown in FIG. 11, the computer device 100 may include one or more (only one is shown in FIG. 11) processors 1002 (the processor 1002 may include but be not limited to a Micro Controller Unit (MCU) or a Field Programmable Gate Array (FPGA) and other processing devices), a memory 1004 for storing data, and a transmission device 1006 for a communication function. Those of ordinary skill in the art should understand that the structure shown in FIG. 11 is only schematic and not intended to limit the structure of the electronic device. For example, the computer device 100 may further include components more or fewer components than the components shown in FIG. 11, or has a configuration different from that shown in FIG. 11.

The memory 1004 may be configured to store a software program and module of application software, for example, a program instruction/module corresponding to a method in the embodiments of the disclosure. The processor 1002 runs the software program and module stored in the memory 1004, thereby executing various functional applications and data processing, namely implementing the above-mentioned method. The memory 1004 may include a high-speed random access memory, and may also include a nonvolatile memory, for example, one or more magnetic storage devices, flash memories or other nonvolatile solid-state memories. In some examples, the memory 1004 may further include a memory arranged remotely relative to the processor 1002, and the remote memory may be connected to the computer device 100 through a network. An example of the above network includes, but is not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

The technical solutions in the embodiments of the disclosure may be freely combined without conflicts.

In some embodiments provided by the disclosure, it is to be understood that the disclosed method and intelligent device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection implemented through some interfaces, device or the units, and may be electrical, mechanical or in other forms.

The units described as separate parts may or may not be physically separated, and parts displayed as units may or may not be physical units. That is, the parts may be located in the same place, or may also be distributed to multiple network units. Part of all of the units may be selected according to a practical requirement to achieve the purposes of the solutions of the embodiments.

In addition, all functional units in each embodiment of the disclosure may be integrated into a second processing unit, each unit may also serve as an independent unit, and two or more than two units may also be integrated into a unit. The integrated unit may be implemented in a hardware form and may also be implemented in form of hardware and software functional unit.

The foregoing is only the specific embodiments of the disclosure and are not intended to limit the protection scope of the disclosure. Any change or replacement which can be easily thought by those skilled in the art in the technical scope disclosed by the disclosure shall fall within the protection scope of the disclosure.

The invention claimed is:

1. A method for improving reliability of paging, comprising:
receiving, by a first base station, a first Radio Resource Control (RRC) message sent by a terminal, wherein the first RRC message is an RRC connection resume request message or an RRC connection establishment request message, the first RRC message carries first indication information, and the first indication information is used to indicate that RRC connection resume or RRC connection establishment is used for location update;
sending, by the first base station, a third RRC message to the terminal based on the first indication information, wherein the third RRC message is used to indicate that the terminal is denied access to the first base station; and sending, to a second base station by the first base station, identification information of a target cell in which the terminal is located when the terminal sends the first RRC message, wherein when paging of the terminal is triggered, the second base station sends a paging message in a Radio Access Network (RAN)-based notification area (RNA) comprising the target cell; and
in response to that the first indication information is used to indicate that RRC connection resume or RRC connection establishment is used for RNA location update, and the first RRC message carries UE identification information of the terminal,
addressing, by the first base station, the second base station according to the UE identification information of the terminal, and sending, to the second base station by the first base station, the UE identification information of the terminal, message authentication code-integrity (MAC-I) information and the identification information of the target cell in which the terminal is located when the terminal sends the first RRC message, wherein the second base station verifies validity of the terminal according to the UE identification information of the terminal and the MAC-I information, and records the identification information of the target cell in an RNA of the terminal, and the second base station sends a paging message in the RNA comprising the target cell when paging of the terminal is triggered.

2. The method of claim 1, further comprising: in response to that the first indication information is used to indicate that RRC connection resume or RRC connection establishment is used for Tracking Area (TA) location update, and the first RRC message carries UE identification information of the terminal,
- addressing, by the first base station, the second base station according to the UE identification information of the terminal, and sending, to the second base station by the first base station, the UE identification information of the terminal, message authentication code-integrity (MAC-I) information and the identification information of the target cell in which the terminal is located when the terminal sends the first RRC message, wherein the second base station verifies validity of the terminal according to the UE identification information of the terminal and the MAC-I information, and records the identification information of the target cell in an RNA of the terminal, and when paging of the terminal is triggered, the second base station sends a paging message in the RNA comprising the target cell while the second base station sends TA information of a target TA in which the terminal is located to a first core network element, and when initiating paging, the first core network element sends a paging message in a TA list comprising the TA information of the target TA.

3. The method of claim 2, wherein when the second base station sends the TA information of the target TA in which the terminal is located to the first core network element, the second base station also sends second indication information to the first core network element, wherein the second indication information is used to indicate to the first core network element that the terminal moves from a source TA to the target TA, and is temporarily unable to access to the first base station, and the first core network element records the TA information of the target TA in a TA list of the terminal based on the second indication information.

4. The method of claim 1, wherein the identification information of the target cell comprises at least one of a Physical Cell Identifier (PCI), an Absolute Radio Frequency Channel Number (ARFCN), a Cell Global Identifier (CGI) and a Tracking Area Code (TAC).

5. The method of claim 1, wherein,
- the second base station and the first base station are different base stations; or,
- the second base station and the first base station are a same base station, and the second base station is a base station that saves UE context information.

6. A device for improving reliability of paging, comprising:
- a processor; and
- a memory configured to store a software program and module;
- wherein the processor is configured to run the software program and module stored in the memory to execute operations in a method for improving reliability of paging; and the method comprises:
- receiving, by a first base station, a first Radio Resource Control (RRC) message sent by a terminal, wherein the first RRC message is an RRC connection resume request message or an RRC connection establishment request message, the first RRC message carries first indication information, and the first indication information is used to indicate that RRC connection resume or RRC connection establishment is used for location update;
- sending, by the first base station, a third RRC message to the terminal based on the first indication information, wherein the third RRC message is used to indicate that the terminal is denied access to the first base station; and sending, to a second base station by the first base station, identification information of a target cell in which the terminal is located when the terminal sends the first RRC message, wherein when paging of the terminal is triggered, the second base station sends a paging message in a Radio Access Network (RAN)-based notification area (RNA) comprising the target cell; and
- in response to that the first indication information is used to indicate that RRC connection resume or RRC connection establishment is used for RNA location update, and the first RRC message carries UE identification information of the terminal,
- addressing, by the first base station, the second base station according to the UE identification information of the terminal, and sending, to the second base station by the first base station, the UE identification information of the terminal, message authentication code-integrity (MAC-I) information and the identification information of the target cell in which the terminal is located when the terminal sends the first RRC message, wherein the second base station verifies validity of the terminal according to the UE identification information of the terminal and the MAC-I information, and records the identification information of the target cell in an RNA of the terminal, and the second base station sends a paging message in the RNA comprising the target cell when paging of the terminal is triggered.

7. The device of claim 6, wherein the method further comprises:
- in response to that the first indication information is used to indicate that RRC connection resume or RRC connection establishment is used for Tracking Area (TA) location update, and the first RRC message carries UE identification information of the terminal,
- addressing, by the first base station, the second base station according to the UE identification information of the terminal, and sending, to the second base station by the first base station, the UE identification information of the terminal, message authentication code-integrity (MAC-I) information and the identification information of the target cell in which the terminal is located when the terminal sends the first RRC message, wherein the second base station verifies validity of the terminal according to the UE identification information of the terminal and the MAC-I information, and records the identification information of the target cell in an RNA of the terminal, and when paging of the terminal is triggered, the second base station sends a paging message in the RNA comprising the target cell while the second base station sends TA information of a target TA in which the terminal is located to a first core network element, and when initiating paging, the first core network element sends a paging message in a TA list comprising the TA information of the target TA.

8. The device of claim 7, wherein when the second base station sends the TA information of the target TA in which the terminal is located to the first core network element, the second base station also sends second indication information to the first core network element, wherein the second indication information is used to indicate to the first core network element that the terminal moves from a source TA to the target TA, and is temporarily unable to access to the first base station, and the first core network element records the TA information of the target TA in a TA list of the terminal based on the second indication information.

9. The device of claim 6, wherein the identification information of the target cell comprises at least one of a Physical Cell Identifier (PCI), an Absolute Radio Frequency Channel Number (ARFCN), a Cell Global Identifier (CGI) and a Tracking Area Code (TAC).

10. The device of claim 6, wherein,
  the second base station and the first base station are different base stations; or,
  the second base station and the first base station are a same base station, and the second base station is a base station that saves UE context information.

* * * * *